Oct. 21, 1969  L. H. J. F. BECKMANN ET AL  3,473,860
OPTICAL SCANNING DEVICE
Filed April 11, 1967

Leo Heinrich Josef Franz Beckmann
Johannes Gerardus Bernardus Schabbink
Gerard Andries Scheltenn de Heere
INVENTORS BY Arthur B. Colvin
ATTORNEY

United States Patent Office 3,473,860
Patented Oct. 21, 1969

3,473,860
OPTICAL SCANNING DEVICE
Leo Heinrich Josef Franz Beckmann and Johannes Gerardus Bernardus Schabbink, Delft, and Gerard Andries Scheltema de Heere, Pijnacker, Netherlands, assignors to N.V. Optische Industrie de oude Delft, a Dutch corporation
Filed Apr. 11, 1967, Ser. No. 630,062
Claims priority, application Netherlands, Apr. 19, 1966, 6605182
Int. Cl. G02b *17/00;* G02f *1/34*
U.S. Cl. 350—7       3 Claims

ABSTRACT OF THE DISCLOSURE

An infrared optical line scanner in which the scanning rotor carries an even number of plane scanning mirrors which alternately reflect an infrared beam into a collecting system, and in which a reflective member such as a triple mirror is placed on the far side of the rotor to pick up a second infrared beam from the same object point and direct the same via the scanning mirror which faces away from the object into the collecting system.

---

Figure 1:
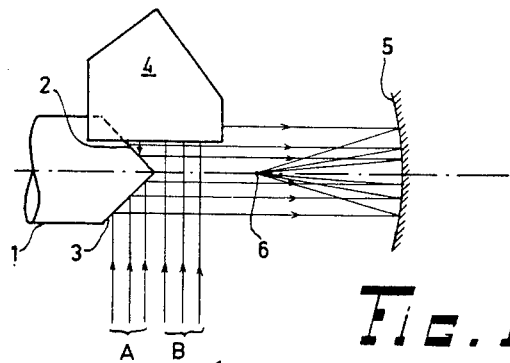

This invention relates to an optical scanning device of the type comprising an even number of plane scanning mirrors arranged for continuous rotation about a common axis of rotation and inclined at equal angles relative to the axis of rotation, and wherein, during each scanning period, the scanning mirror which is then facing the object scanned reflects a beam of radiation received from the object point momentarily scanned, toward an optical objective which focuses the radiation on a detector which is sensitive thereto.

Optical scanning devices of this type are primarily, though not exclusively, used in the art of thermography, i.e. the conversion into visible form of radiation images in the socalled "far" infrared part of the electromagnetic spectrum (2–50 μm). One difficulty encountered with this kind of apparatus is that the scanning mirrors which at any time are non-operative in that they are facing away from the scanned object may considerably contribute to the radiation becoming incident on the detector, if no special measures have been taken to prevent this. Generally, the walls of the device, or other surfaces enclosing the space in which the mirrors rotate will be of a nature and will have a temperature such that they produce a considerable emission of the wave lengths for which the detector is sensitive and such radiation will be reflected by the non-operative scanning mirrors into the radiation collecting system. Even if such surfaces could be covered by some isothermal screen having homogeneous radiation characteristics so that no false signals can be received by the detector on that account, the additional amount of radiation received from such a screen would still be undesirable because it would reduce the signal-to-noise ratio.

An effective suppression of such unwanted radiation can only be obtained by cooling the screen down to very low temperatures, e.g. in the order of 150–200° Kelvin. However, evidently such a cooling for a screen of considerable size would often be very impracticable.

A different way to solve the problem indicated would be to reduce the size of the entrance pupil of the collecting objective such that only the useful radiation coming from the object scanned is indeed collected while radiation reflected toward the objective by non-operative scanning mirrors is refused. That method has the disadvantage, however, that the effective aperture of the system as determined by the surface of the rotating scanning mirrors, is not fully used.

The present invention has for its object to provide means by which not only the problem indicated hereinbefore is avoided or reduced, but also the amount of useful radiant energy received by the detector is increased without an enlargement of the scanning mirrors.

In accordance with the invention the optical scanning device is provided with a stationary reflective member which reflects a second beam of radiation also received from the object point momentarily scanned toward the scanning mirror facing may from the object scanned, such that this second beam, after reflection at the latter scanning mirror, is likewise received by the objective and focused on the detector.

Thus, in the scanning device according to the invention, the detector "views" an object point not only via the scanning mirror which, at the time considered, is turned toward the object, but also via the opposite scanning mirror which at that time is facing away from the object, and the stationary reflective member. Thus, in the simplest form of a scanning device having only two scanning mirrors no radiation other than that originating from the object can reach the detector since the stationary reflective member, as a mirror, will emit no appreciable amount of radiation itself.

But even if more than two, e.g. four, scanning mirrors are used, the invention is advantageous because, essentially, by activating also the scanning mirror facing away from the object, the useful signal is increased by a factor 2, whereas false radiation can yet only be received via the two remaining scanning mirrors which are momentarily facing sideward.

It may be mentioned here that the decision on the number of scanning mirrors to be used will be made on a case to case basis, taking into account the various requirements e.g. as regards the scanning angle, the scanning repetition frequency and the maximum admissible number of revolutions per minute of the scanning mirrors. The invention can be applied to all such scanners, provided that there is an even number of scanning mirrors.

Figure 3:
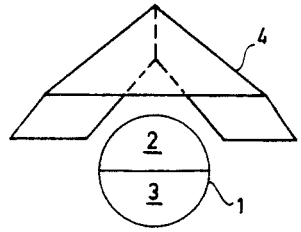
Figure 2:
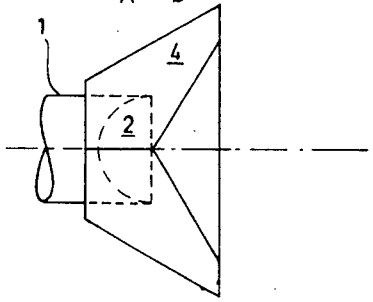
Figure 5:
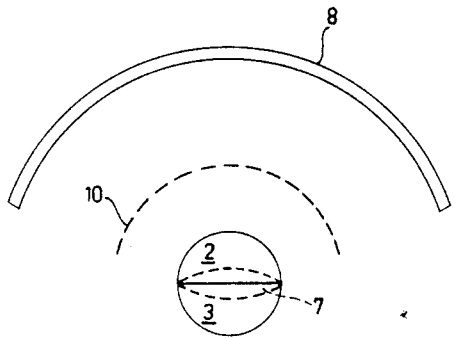
Figure 4:
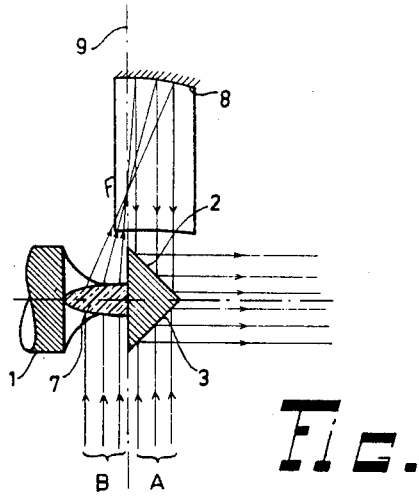

In the drawing:
FIG. 1 shows in side elevation a scanning device according to the invention with two scanning mirrors and a triple mirror as reflective member;
FIG. 2 shows in top view a portion of the device of FIG. 1;
FIG. 3 shows the same portion in front elevation;
FIG. 4 shows in vertical axial cross-section a portion of another scanning device according to the invention, having a spherical concave mirror as its reflective member; and
FIG. 5 shows the arrangement of FIG. 4 in front elevation.

The scanning devices illustrated in the drawings can be used in different well-known fashions, such as for repetitiously scanning one line or narrow strip of an object which is held stationary relative to the scanning device, as well as for subsequently scanning adjacent lines or strips of an object, in which case the scanning device and the object will move relatively to each other in a direction perpendicular to the direction of scanning.

In FIGS. 1–3 a rotatably supported shaft 1 at its end two plane scanning mirrors 2 and 3 which are both at an angle of 45° with respect to the axis of rotation. Shaft 1 is driven at a constant speed by a motor (not shown) whereby the scanning mirrors alternately scan a line of the distant object. A first beam of radiation A emitted by the point of the object momentarily scanned is received by the scanning mirror facing the object (in the position shown this is mirror 3), and thence reflected toward an optical objective which, in the species illustrated, is a parabolic mirror 5 whose optical axis coincides with the axis of rotation of the scanning mirrors 2 and 3.

The device further comprises a triple mirror 4 whose three reflective surfaces are at angles of 90° with respect to each other. As is well-known, such a triple mirror has the property to reflect each ray entering the mirror from a direction lying within the solid angle subtended by the mirror back into the same direction. The triple mirror is fixedly positioned on the side of the shaft 1 remote from the object with its top precisely over the middle of the line along which the scanning mirrors 2 and 3 meet each other. Consequently, the right hand portion of the triple mirror 4 is free to pick up a second parallel beam of radiation B and will throw the same after two or three reflections on the scanning mirror 2 which is facing away from the object. Upon reflection by scanning mirror 2 the beam B, together with the beam A, is focused by the parabolic mirror 5 on a small detector 6 which is placed at the focus of the parabolic mirror. The electric signals produced by the detector can be processed in any conventional manner.

The triple mirror can accommodate an effective scanning angle of 90° at most. Should it be required to scan larger angles as is quite well possible in the case of two scanning mirrors, then a different solution must be applied, such as the form illustrated in FIGS. 4 and 5. Instead of a triple mirror, in that case a stationary concave spherical mirror 8 is used as a reflective member. This mirror 8 has in the direction parallel to the axis of rotation of the scanning mirrors a relatively small dimension determined by the size of the scanning mirrors 2, 3 whereas, on the contrary, it covers a large arc in a plane perpendicular to the axis of rotation so as to accommodate the required scanning angle which in the example shown is approximately 120°.

The center of curvature of the mirror 8 lies on the axis of rotation at the point where that axis intersects the plane which is perpendicular to the axis of rotation and contains the summits of the scanning mirrors 2 and 3 (in FIG. 4 that plane has been designated 9). The active part of mirror 8 lies on the right of plane 9. Mirror 8, similarly to the triple mirror 4 in FIGS. 1–3, throws a parallel beam or radiation on the scanning mirror 2 which is facing away from the object, and this scanning mirror thence reflects such radiation toward the collecting objective (not shown) of the device. The entering beam B originating from the object point momentarily scanned, must be focused first in the focal point F of the concave mirror 8. Point F lies in the plane 9 just halfway between the axis of rotation and the mirror 8. Focusing is achieved by means of a lens 7 which is mounted in the axis of rotation and has the same focal length as the mirror 8. Lens 7 should of course be made of a material allowing sufficient transmission for the radiation concerned. The lens 7 is fixedly mounted in the shaft 1 so that it rotates with the shaft and is alternately traversed by the radiation in opposite directions. Accordingly, the lens 7 should be a single symmetrical lens, as shown, or a lens system which is symmetrical to the axis of rotation. As only that half of lens 7 which is on the left of the plane 9 is really used the remainder of the lens body has been omitted.

When shaft 1 is rotated the focal point F traces a circular path 10 having its center on the axis of rotation (FIG. 5).

Preferably, lens 7 will be so constructed that its spherical aberration balances the spherical aberration of the concave mirror 8 as far as possible. To achieve this it may be helpful to provide the lens with aspherical surfaces.

It will be understood that a lens similar to lens 7 in FIG. 4 could be placed on the right of the scanning mirrors, instead of on the left. In that case, of course, the plane equivalent to the plane 9 in FIG. 4 would contain the line along the scanning mirrors 2 and 3 meet each other.

Should the device of FIGS. 4 and 5 be used to scan an object placed at a finite distance from the scanner, then the lens 7 should, of course, focus the divergent beam B to a point slightly nearer to the concave mirror 8 than the focal point F, in order that the beam reflected by mirror 8 shall have approximately the same divergency as the beam A which comes indirectly from the object. Which difference in divergency between the two beams entering the collecting objective can be permitted depends on the depth of sharpness of that objective.

What we claim is:

1. An optical scanning device comprising a rotor having an axis of rotation, an even number of plane scanning mirrors on one end of said rotor inclined at equal angles to said axis of rotation, a stationary triple mirror having reflective surfaces at angles of 90° with respect to each other and facing said rotor, said triple mirror being located on a side of said rotor remote from the object being scanned and partly projecting in front of said one end of said rotor, a focusing objective located on said axis of rotation and spaced from said scanning mirrors, detecting means optically aligned with said objective and scanning mirrors, whereby, in operation, part of the radiation from said object is reflected from the scanning mirror facing the object to said objective and finally focused on said detecting means while other radiation from said object passes in front of said rotor and thereafter is reflected from said triple mirror to the scanning mirror facing away from the object onto said objective and focused therefrom on said detecting means.

2. An optical scanning device comprising a rotor having an axis of rotation, an even number of plane scanning mirrors on one end of said rotor inclined at equal angles to said axis of rotation, a stationary spherical concave reflecting mirror optically aligned with said scanning mirrors at a substantially right angle to said axis of rotation, and located on a side of said axis remote from the object being scanned, a focusing lens means symmetrical to the axis of rotation attached to said rotor in optical alignment with said concave reflecting mirror and having its focus substantially coinciding with the focus of said concave reflecting mirror, a focusing objective located on said axis of rotation and spaced from said scanning mirror, detecting means optically aligned with said objective and scanning mirrors, whereby, in operation, part of the radiation from said object is reflected from the scanning mirror facing said object to said objective and finally focused on said detecting means while other radiation from said object is transmitted by said lens means to said concave mirror and reflected from the latter to the scanning mirror facing away from the object onto said objective and focused therefrom on said detecting means.

3. A scanning device as claimed in claim 2, wherein the lens means is mounted on the side of the scanning mirrors remote from the optical objective.

References Cited

UNITED STATES PATENTS

| | | | |
|---|---|---|---|
| 2,206,169 | 7/1940 | Eisenhut et al. | |
| 2,758,502 | 8/1956 | Scott et al. | 350—7 |
| 2,997,539 | 8/1961 | Blackstone | 350—7 |
| 3,211,046 | 10/1965 | Kennedy | 350—7 |
| 3,212,100 | 10/1965 | Buck. | |
| 3,264,480 | 8/1966 | Zuck et al. | 350—7 |
| 3,277,772 | 10/1966 | Atwood | 350—7 |

DAVID SCHONBERG, Primary Examiner

P. R. GILLIAM, Assistant Examiner

U.S. Cl. X.R.

350—285